(12) United States Patent
Matsui

(10) Patent No.: US 7,322,703 B2
(45) Date of Patent: Jan. 29, 2008

(54) LIGHT EMITTING APPARATUS AND PROJECTOR

(75) Inventor: Shinzo Matsui, Uenohara (JP)

(73) Assignee: Olympus Corporation, Tokyo (JP)

( * ) Notice: Subject to any disclaimer, the term of this patent is extended or adjusted under 35 U.S.C. 154(b) by 294 days.

(21) Appl. No.: 11/130,780

(22) Filed: May 17, 2005

(65) Prior Publication Data

US 2006/0007407 A1 Jan. 12, 2006

(30) Foreign Application Priority Data

Jul. 7, 2004 (JP) ............................. 2004-200267

(51) Int. Cl.
G03B 21/26 (2006.01)
G03B 21/28 (2006.01)
G03B 21/20 (2006.01)
G02F 1/1335 (2006.01)
G02B 27/14 (2006.01)
G02B 27/12 (2006.01)
G02B 5/04 (2006.01)
G02B 5/22 (2006.01)
G02B 6/32 (2006.01)
F21V 7/04 (2006.01)
H01L 33/00 (2006.01)
H04N 9/12 (2006.01)

(52) U.S. Cl. .................. 353/84; 353/29; 353/31; 353/33; 353/37; 353/81; 353/94; 353/99; 353/102; 349/106; 359/634; 359/638; 359/639; 359/640; 359/834; 359/837; 359/891; 362/555; 362/561; 362/231; 362/800; 385/34; 385/133; 385/901; 348/743; 348/759

(58) Field of Classification Search .................. 353/84, 353/29, 30, 31, 33, 37, 81, 94, 98, 99, 102; 348/739, 744, 759, 771, 742, 743; 349/5, 349/7, 8, 106; 359/618, 629, 634, 638–640, 359/834, 837, 891; 362/551, 555, 561, 612, 362/615, 623, 800, 227, 231; 385/34, 133, 385/146, 901
See application file for complete search history.

(56) References Cited

U.S. PATENT DOCUMENTS

2005/0128441 A1* 6/2005 Morgan ...................... 353/102

FOREIGN PATENT DOCUMENTS

| JP | 06-141262 | 5/1994 |
| JP | 2000-89139 | 3/2000 |
| JP | 2000-305040 | 11/2000 |
| JP | 2002-296680 | 10/2002 |
| JP | 2003-263902 | 9/2003 |

* cited by examiner

Primary Examiner—Rochelle Blackman
(74) Attorney, Agent, or Firm—Volpe & Koenig PC

(57) ABSTRACT

An light emitting apparatus which illuminates an illumination area has a first light source which emits a first light, a second light source which emits a second light, a wheel which is provided with a transmission filter area which transmits the first light, and a reflection area which reflects the second light, a wheel driving unit which controls a rotation of the wheel, and drives the wheel, a light emitting optical unit which leads the first light which transmits the transmission filter area, or the second light which is reflected by the reflection area to the illumination area, in which the light which is led to the illumination area by the light emitting optical unit is at least two colors of light which are successively changed over in the time series.

15 Claims, 12 Drawing Sheets

LIGHT EMITTING APPARATUS AND PROJECTOR

BACKGROUND OF THE INVENTION

1. Field of the Invention

The present invention relates to a light emitting apparatus for color display using a wheel and a projector which is provided with the light emitting apparatus.

Priority is claimed on Japanese Patent Application No. 2004-200267, filed Jul. 7, 2004, the content of which is incorporated herein by reference.

2. Description of Related Art

Although, conventionally, various types of projectors of which projecting types differ are offered, as the projectors being common at present, a liquid crystal type of liquid crystal projector or a Digital Light Processing (hereinafter, abbreviated as DLP, which is a registered trademark) type of DLP projector is mainstream.

The liquid crystal projector uses, for example, three transmission liquid crystals of red color (R), green color (G), and blue color (B), and performs magnification projection while lighting the transmission liquid crystals from the rear; therefore adjustment is easy, and miniaturization and weight saving can be attained. Moreover, in the DLP projector, a plurality of minute movable mirrors which are provided in a Digital Micromirror Device (hereinafter, which is abbreviated as DMD) are moved at the speed of not less than several ten thousands of cycles per second, and thereby the image is formed, in addition to the advantage of the liquid crystal projector, the advantage can be obtained in which the decrease of the light is low, and thereby the light contrast can be obtained, a high-precision image which is seamless can be reproduced at high-brightness, high-resolution image display in which uniformity of the brightness is excellent, and stability is high can be carried out, and defects are unlikely to occur, and the like.

Here, a general constitution of the DLP projector is shown in FIG. 21 and FIG. 22.

The DLP projector 100 is provided with a lamp 101 which emits white color the light, red color (R), green color (G), and blue color (B) of color filters 103a, 102b, and 102c, a color wheel 102 which is rotated and driven by a motor 103, an integrator rod 104 which reduces the lighting unevenness of the light which passes through the color filters 102a, 102b, and 102c, and TIR (Total Internal Reflection) prism 107 in which the light which passed through the integrator rod 104 is entered into the DMD 105, and the image which is modulated by the DMD 105 is emitted to the projection lens 106.

After the white light which is emitted from the lamp 10 is emitted as the red color (R), the green color (G), and the blue color (B) of light in a time series by the color wheel 102, the light thereof is entered into the integrator rod 104. Furthermore, each color of light which has passed through the integrator rod 104 (in this case, the lighting unevenness of each color of light is lost) is performed a whole reflection in the TIR prism 107, and is entered into the DMD 105. After the light which is entered into the DMD 105 is modulated by the image data according to each color, the light is successively entered into the projection lens 106 via the TIR prism 107, again, and is projected as the color image on the screen (not shown in the figure).

Moreover, as a representational example of the lamp 101 which constitutes the projector 100, a spectral property of a very-high-pressure mercury lamp is shown in FIG. 23, and a chromaticity diagram of each light in the case in which the light of the very-high-pressure mercury lamp passes through a predetermined color filter is shown in FIG. 24. In addition, a horizontal axis in FIG. 23 shows the wavelength λ (unit is nm) of the light, and a longitudinal axis shows the relative intensity S.

As shown in FIG. 23, the very-high-pressure mercury lamp has the feature of having the strong relative intensity S near almost 450 nm (blue color) of wavelength λ, almost 550 nm (green color) of wavelength λ, and almost 590 nm (orange color) of wavelength λ, and on the other hand, not having the strong relative intensity S in the red component in the range of 600 to 700 nm of wavelength λ.

Therefore, when the very-high-pressure mercury lamp is used, in the case of designing the red color (R) of the color filter, the design is performed by using both the orange color of the wavelength component of the light of which the peak is near almost 590 nm and the width range of wavelength component which is 600 to 700 nm. As a result, a color expression range as shown by a dotted line in FIG. 24 is obtained.

As mentioned above, because the red color (R) is expressed using the orange color of the wavelength component of the light, as shown in FIG. 24, the area occurs in which the color expression cannot be carried out. That is, in the projection image using the very-high-pressure mercury lamp, a disadvantage occurs in that the reproduction of a part of the reddest color, the purplish red, or the like is difficult.

On the other hand, as a light emitting diode (LED), at present, a high power LED emitting at highbrightness, and the like are developed and provided, and further, various wavelengths of single wavelength LED, and the like are provided. Then, in order to solve the above-mentioned problem, the hybrid type of various apparatuses are beginning to be offered in which the LED light source is added to the lamp light source such as the very-high-pressure mercury lamp, and the like.

For example, as one example, the projection type of display apparatus is known in which the light from the red color (R) of light emitting diode is entered into a liquid crystal panel for the red via the lens array, after the optical image from the liquid crystal panel for the red and the blue color (B) and the green color G) of the optical image emitted from the lamp are composited by the compositing prism, the composite image is displayed on the screen by the projection lens (Patent Document 1: Japanese Unexamined Patent Application, First Publication No. 2000-305040).

Moreover, as the other example, a head portion equipping type of display apparatus is known in which the blue color (B) of an image is displayed by the lamp light source, the red color (R) and the green color (G) of images are displayed by the light emitting diode panel, the images thereof are composited by a polarization beam splitter, and the color image is obtained (for example, Patent Document 2: Japanese Unexamined Patent Application, First Publication No. H6-141262).

Moreover, as the other example, an image display apparatus is known in which, after the light emitted from the lamp and the red color (R) of light emitted from the leaser light source are composited by the light composition unit such as a reflection type of hologram element, a dichroic prism, or the like, each color (the red color (R), the green color (G), and the blue color B) of light is led to the liquid crystal display panel, the image light according to each color is generated, each image light thereof is composited again, and the composite image light is displayed on the screen (Patent Document 3: Japanese Unexamined Patent Application, First Publication No. 2002-296680).

Moreover, in the Patent Document 3, the light emitted from the lamp and the light emitted from the light emitting diode are composited by the dichroic prism, the composite light is separated into the red color (R), the green color (G), and the blue color (B) of light in the time series by the color wheel, is led to the DMD, and is displayed as the color image on the screen.

Furthermore, as the other example, the light emitting apparatus is known in which a green color (G) of beam emitted from the lamp and red color (R) and blue color (B) of beams emitted from the LED element are composited by the dichroic prism, each color of light which is composited is modulated according to each color by the liquid crystal panel, and is displayed as the image on the screen (for example, Patent Document 4: Japanese Unexamined Patent Application, First Publication No. 2003-263902).

Moreover, when the green color (G) of beam is obtained by the light emitted from the lamp, the light emitting apparatus is arranged between the lamp and the dichroic mirror, and uses a disc shape, that is, a wheel shape of color filter which is provided with the green color (G) of filter portion and the shading portion which shades the light. That is, the green color (G) of the beam can be obtained during a predetermined time by rotating the color filter. Moreover, when shading the light from the lamp in the shading portion, the red color (R) and the blue color (B) of beams are lightened while shifting the timing by the LED element. Thereby, the red color (R), the green color (G), and the blue color (B) of beams can be successively entered into the liquid crystal panel via the composition prism in the time series.

SUMMARY OF THE INVENTION

An object of the present invention is to provide an light emitting apparatus in which the light emitted from two light sources such as the lamp and the LED, and the like can be selected in the time series and be taken out, while simplification and miniaturization of the constitution can be attained, and moreover, a DLP type of projector which is provided with the light emitting apparatus.

The present invention is provided with the following units.

The present invention is a light emitting apparatus which illuminates an illumination area, has a first light source which emits a first light, a second light source which emits a second light, a wheel which is provided with a transmission filter area which transmits the first light, and a reflection area which reflects the second light, a wheel driving unit which controls a rotation of the wheel, and drives the wheel, a light emitting optical unit which leads the first light which transmits the transmission filter area, or the second light which is reflected by the reflection area to the illumination area, in which the light which is led to the illumination area by the light emitting optical unit is at least two colors of light which are successively changed over in a time series.

In the present invention, the first light source may be a lamp, and the second light source may be a light emitting diode.

In the present invention, the first light which is emitted from the lamp may be white, and the transmission filter area may have at least one color among a red color, a green color, and a blue color.

In the present invention, a central wavelength of the light which is transmitted to the transmission filter area may be the central wavelength which is not coincident with a central wavelength of the second light.

In the present invention, the light emitting diodes may be composed of two varieties of light emitting diodes which emit different color light.

In the present invention, the second light source is a light emitting diode, and a light emitting diode lighting unit which controls the second light which is emitted by lighting the light emitting diode is provided, the light emitting diode lighting unit performs pulse lighting of the light emitting diode synchronizing with rotation of the wheel, while the light emitting diode may be controlled so that quantity of light of the second light which is emitted becomes maximum at a timing in which the second light emitted from the light emitting diode is reflected in the reflection area.

In the present invention, the second light source is a light emitting diode, and a light emitting diode lighting unit which controls the second light which is emitted by lighting the light emitting diode is provided, the light emitting diode lighting unit performs lighting of the light emitting diode synchronizing with rotation of the wheel, while the light emitting diode may be controlled so that the light emitting diode is put out light at a timing in which the second light emitted from the light emitting diode is not reflected in the reflection area.

In the present invention, the wheel may be composed of the transmission filter area and the reflection area which are arranged within the same plane.

In the present invention, the wheel may be composed of the transmission filter area and the reflection area which are arranged so that the transmission filter area and the reflection area are maintained at a predetermined angle with regard to an axis which is rotated and driven.

In the present invention, an angle between a straight line connecting a central position of area in which the first light passes through the transmission filter area and a central position of the first light source and the surface of the transmission filter area may be set at 45 degrees.

In the present invention, an angle between a straight line connecting a central position of area in which the second light is reflected by the reflection area and a central position of the second light source and the surface of the transmission filter area may be set at 45 degrees.

In the present invention, a total internal reflection prism may be provided at a position in which the second light which is emitted from the second light source is entered into the reflection area, while the second light which is reflected by the reflection area passes through, and at a position at which the first light which is emitted from the first light source and passes through the transmission filter area is entered into the light emitting optical unit.

In the present invention, the second light source may be provided with a plurality of light emitting diodes which are arranged on the circumference of a circle, a light emitting diode lighting unit which makes the plurality of light emitting diodes light in order of being arranged on the circumference of the circle during different periods in a time series, a rotation optical unit which is rotatably arranged with a rotation center which is a center of the circumference of the circle, in which each light which is emitted from the plurality of light emitting diodes is entered from the light entering end while rotating, and the light is emitted from the light emitting end, in which the wheel driving unit and the rotation optical unit may be controlled so that the wheel driving unit and the rotation optical unit rotate in synchrony.

In the present invention, the reflection area may reflect the second light, while the reflection area may block light so that the first light is not led to the light emitting optical unit.

In the present invention, the light emitting optical unit may be set so that the light emitting optical unit leads two colors of light consisting of a first color and a second color to the illumination area, and the reflection area may be formed by a dichroic surface which transmits the first colored light, and reflects the second colored light.

The present invention is a projector which projects a image according to the image information which is inputted, having the above-mentioned light emitting apparatus, a space modulation unit which modulates the light led by the light emitting optical unit according to the image information, and generates the projecting light, and a projection optical unit which projects the projecting light generated by the space modulation unit.

DETAILED DESCRIPTION OF THE INVENTION

Next, a first embodiment of a light emitting apparatus and a projector according to the present invention is explained with reference to FIG. 1 to FIG. 11.

Figure 1:
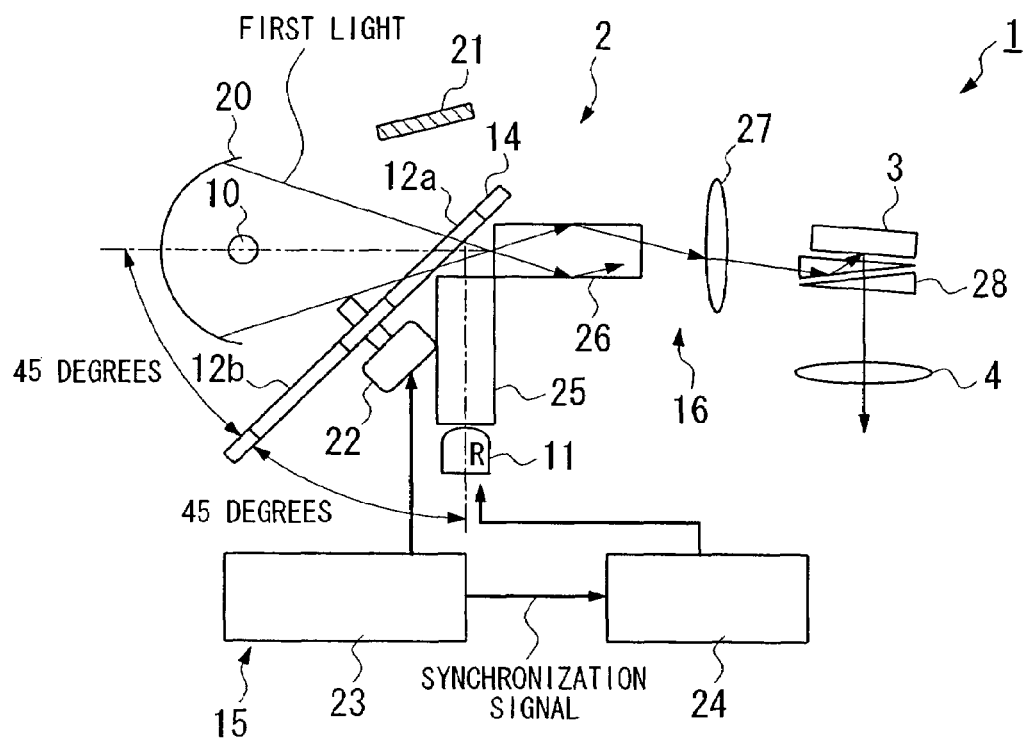
FIG. 1 is a construction view of a projector and a light emitting apparatus of a first embodiment according to the present invention.

A projector 1 according to the present embodiment projects the image according to the image information which is inputted, and, as shown in FIG. 1, is provided with a light emitting apparatus 2, a Digital Micromirror Device (thereinafter, which is abbreviated as DMD)(a space modulation unit) 3 which modulates the light led by an after-mentioned light emitting optical unit 16 of the light emitting apparatus 2 according to the image information, and generates the projecting light, and a projection lens (a projection optical unit) 4 which projects the projecting light generated by DMD 3 on a screen (not shown in the figures).

The light emitting apparatus 2 illuminates the DMD 3 which is an illumination area, and is provided with a lamp (a first light source) 10 which emits the first light, light emitting diodes (LEDs)(a second light source) 11 which emit the second light, a wheel which is composed of a transmission filter area 12 in which the light transmits, and a mirror (a reflection area) 13 by which the second light is reflected, a wheel driving unit 15 by which a rotation of the wheel 14 is controlled and the wheel 14 is driven, and a light emitting optical unit 16 by which the first light transmitting the transmission filter area 12, or the second light reflected by the mirror 13 is led to the DMD 3.

Moreover, the light led to the DMD 3 by the light emitting optical unit 16 is at least two colors of light which successively change over in the time series. In addition, in the present embodiment, it is explained that a red color (R), a green color (G), and a blue color (B) light is led to the DMD 3.

For example, the lamp 10 is a high-pressure mercury lamp which emits the white first light, and emits the first light toward one direction (toward a right side with regard to the paper surface) by an elliptical reflector 20 arranged at the circumference thereof.

In addition, the lamp is not limited to the high-pressure mercury lamp, and a metal halide lamp or a xenon lamp is used as the lamp 10.

Figure 2:
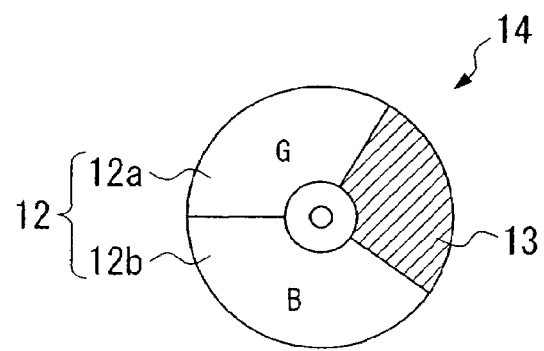
FIG. 2 is a front view of a wheel of the light emitting apparatus shown in FIG. 1.

As shown in FIG. 2, the wheel 14 is formed to a disc shape so that the transmission filter area 12 and the mirror 13 are arranged within a same plane.

Moreover, the transmission filter area 12 has at least one color among the red color (R), the blue color (B), and the green color (G), and has two colors of the green color (G) and the blue color B) in the present embodiment. That is, the transmission filter area 12 is provided with a first transmission member 12a which is a dichroic filter transmitting the light which has the green color (G) of wavelength band among the white first light emitted from the lamp 10, and a second transmission member 12b which is a dichroic filter transmitting the light which has the blue color (B) of wavelength band among the first light. The central wavelength of the light which transmits both transmission members 12a and 12b is set so that the wavelength which is not coincident with the central wavelength of the second light emitted from the LED 11 is transmitted.

In addition, a shading area which shades the first light may be provided between the first transmission member 12a and the second transmission member 12b. Moreover, both transmission members 12a and 12b are not limited to the dichroic filters, and filters which transmit a specific color may be used as the transmission members 12a and 12b.

The mirror 13 has a function in which the second light is reflected, and the first light is shaded so as not to lead the first light to the light emitting optical unit 16. That is, the mirror 13 has a function of reflecting the first light which is emitted from the lamp 10. Moreover, as shown in FIG. 1, a shading plate 21 which absorbs the first light reflected by the mirror 13 is provided between the lamp 10 and the wheel 14.

The wheel 14 is rotated and driven by the motor 22, and the rotating direction thereof is the direction in which the first transmission member 12a, the second transmission member 12b, and the mirror 13 is successively changed over at the position into which the first light is entered.

Furthermore, the wheel 14 is arranged so that an angle between a straight line connecting a central position of an area in which the first light passes through the transmission filter area 12 and a central position of the lamp 10 and the surface of the transmission filter area, that is, the plane of the wheel 14 is set at 45 degrees.

Moreover, the driving of the motor 22 is controlled by a wheel driving portion 23. The wheel driving portion 23 and the motor 22 function as the wheel driving unit 15.

The LED 11 emits the red color (R) of second light of which the wavelength is, for example, 650 nm, and an angle between a straight line connecting a central position of an area in which the second light is reflected by the mirror 13 and a central position of the LED 11 and the surface of the transmission filter area, that is the plane of the wheel 14 is set at 45 degrees.

The lighting timing of the LED 11 is controlled by the LED lighting unit 24. That is, the LED lighting unit 24 performs pulse lighting of the LED 11 synchronizing with rotation of the wheel 14, while the LED 11 is controlled so that the LED is put out light at a timing in which the second light emitted from the LED 11 is not reflected by the mirror 13 (that is, at the time in which the transmission filter area is positioned at the position into which the second light is entered).

Moreover, a light leading member 25 which is an inner packed rod (a glass rod) of which the shape is a quadrangle in the cross-sectional view is arranged between the LED 11 and the wheel 14, and after the second light emitted from the LED 11 passes through the light leading member 25, the second light is entered into the wheel 14.

The light emitting optical unit 16 is arranged at the position being adjacent to the wheel 14, and is provided with a hollow pipe 26 of which the shape is a quadrangle in the cross-sectional view (an integrator rod) which makes the first light transmitted in the transmission filter area 12, and the second light reflected by the mirror 13 pass through while reflecting repeatly the first light and the second light by the inner surface thereof, a lens 27 which condenses the first light and the second light which passes through the hollow pipe 26, and a total internal reflection (TIR) prism 28 which leads the first light and the second light after passing through the lens 27 to the DMD 3.

The hollow pipe 26 carries out repeatly the inner reflection of the first light and the second light which are emitted from one end of the hollow pipe 26 by the reflection film on the inner surface thereof, and thereby the hollow pipe 26 has a function of emitting both light from another end of the hollow pipe 26 in a state in which the lack of uniformity is overcome.

Moreover, the TIR prism 28 is composed of two prisms between which an air layer is placed, and has a function in which a whole of the first light and the second light after passing through the lens 27 is reflected, and are entered into the DMD3, while the first light and the second light which is emitted from the DMD 3 are entered into the projection lens 4.

The DMD 3 is a semiconductor lighting switch which has a plurality of minute movable mirrors (not shown in the figures). The angle of the minute movable mirror is changed according to the state of ON and OFF, and the light is emitted to the projection lens 4 in the ON state. Moreover, according to the image which is inputted, the ON and OFF states of the minute movable mirror are controlled, and thereby the modulation can be carried out. Thus, by performing the ON and OFF control, the modulation image is expanded by the projection lens 4, and is displayed on the screen (not shown in the figures).

Hereinafter, the case in which the image is projected on the screen by the light emitting apparatus 2 and the projector 1 which are constituted as such is explained.

In addition, as a initial setting which is previously performed, a ratio of the display time of the image data which is decomposed to each of the red color (R), the green color (G), and the blue color (B) which is modulated by the DMD 3 is determined. That is, the time width of each color is set in order to adjust the white balance of the red color (R), the green color (G), and the blue color (B) of the projection image. Moreover, as coincident with the setting thereof, a square measure ratio of the first transmission member 12a and the second transmission member 12b of the wheel 14, and the mirror 13 is determined.

Moreover, as mentioned above, the LED lighting unit 24 is controlled so that LED 11 is put out at the time in which the transmission filter area 12 reaches the entering position of the second light, and corresponding to the above, the DMD 3 is set so that the DMD 3 previously adjusts the timing of the OFF control as the non-modulation term of the minute movable mirror, based on the relation the rotation of the wheel 14 and the entering position of the second light, so that the minute movable mirror of the DMD 3 is set at the OFF state at the time in which both the first transmission member 12a and the second transmission member 12b are entered into the area in which the DMD 3 is entered into the hollow pipe 26.

After the initial setting is finished, the lamp 10 is turned out, while the motor 22 is operated by the wheel driving portion 23, and an the wheel 14 is rotated. Thereby, the mirror 13, the first transmission member 12a, and the second transmission member 12b is successively changed over at the entering position for the wheel 14 of the first light and the second light in the time series.

Figure 3:
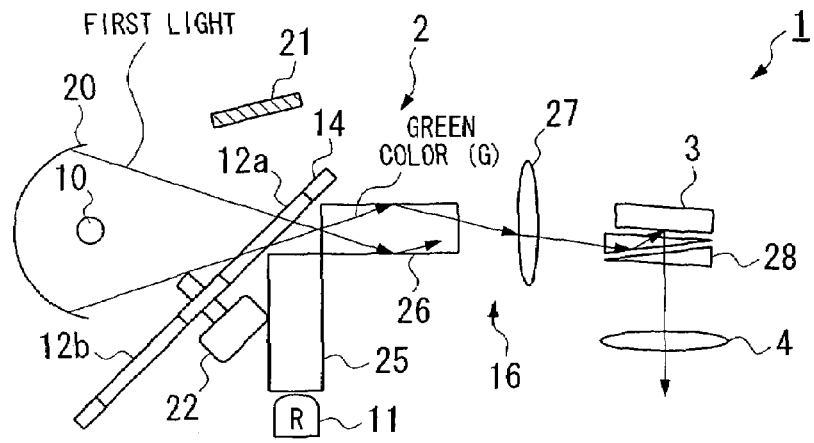
FIG. 3 is a view showing a state in which a first light emitted from a lamp of the light emitting apparatus shown in FIG. 1 transmits a first transmission member of the wheel, becomes a green color (G) of light, and illuminates Digital Micromirror Device (DMD).
Figure 4:
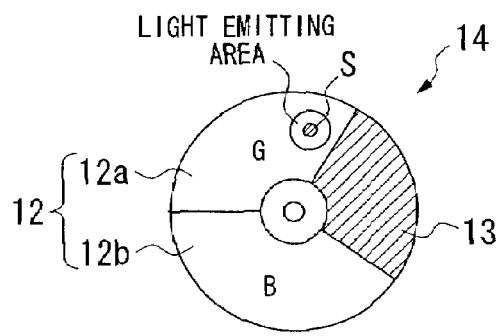
FIG. 4 is a front view of the wheel which shows a state in which a first light enters into the first transmission member in the state of FIG. 3.
Figure 5:
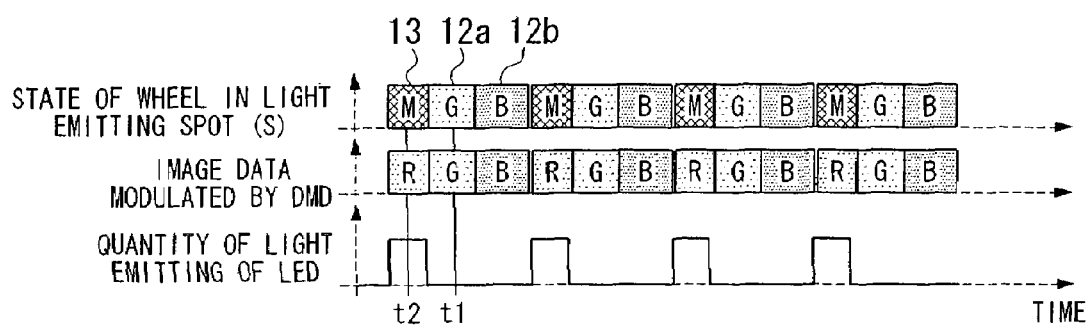
FIG. 5 is a timing chart which shows the synchronous relation between the luminescence of the LED and the wheel in the light emitting apparatus shown in FIG. 1.

Here, for example, when the first transmission member 12a is positioned at the entering position of the first light (at the time of t1 shown in FIG. 5), as shown in FIG. 3, the first light emitted from the lamp 10 transmits the first transmission member 12a, thereby the first light becomes the green color (G) of light, and is entered into one end of the hollow pipe 26. In addition, in such a case, as shown in FIG. 4, the first light is entered into the first transmission member 12a in the circular shape of the light emitting area. In addition, a light emitting spot S shown in FIG. 4 shows a central position of the light emitting area.

Moreover, in such a case, as shown in FIG. 3, the LED 11 is not turned on, and the second light is not emitted.

As shown in FIG. 3, the green color (G) of the first light which is entered into the hollow pipe 26 repeats the inner reflection, and is emitted from another end of the hollow pipe 26. Thereby, the green color (G) of first light becomes the light without the lighting unevenness. Furthermore, the green color (G) of first light which is entered into the TIR prism 28 via the lens 27 is entirely reflected, and is entered into the DMD 3. The DMD 3 performs the modulation of the image data according to the green color (G), and emits the green color (G) of light after modulating into the projection lens 4.

Moreover, when the second transmission member 12b is positioned at the light emitting area, as well as in the case of being mentioned above, the blue color (B) of light after modulating is emitted to the projection lens 4.

Figure 6:
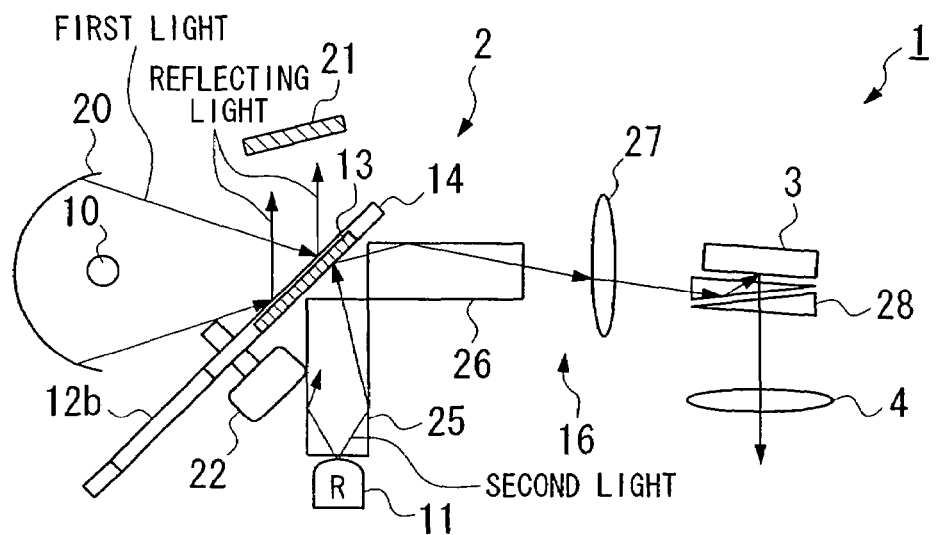
FIG. 6 is a view showing a state in which a red color (R) of a second light emitted from a light emitting diode (LED) of the light emitting apparatus shown in FIG. 1 is reflected by a mirror of the wheel, and illuminates DMD.
Figure 7:
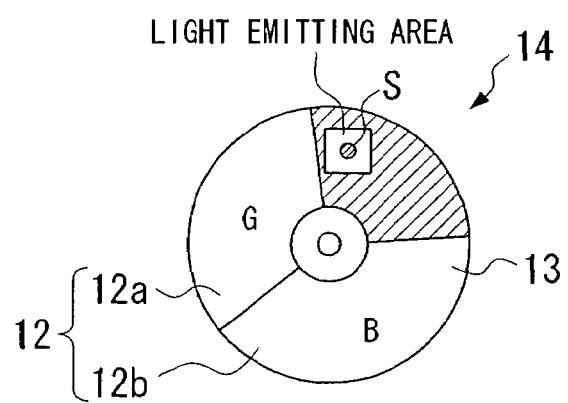
FIG. 7 is a front view of the wheel which shows a state in which a second light enters into the mirror in the state of FIG. 6.

Next, when the mirror 13 is positioned at the entering position of the first light (at the time of t2 shown in FIG. 5), as shown in FIG. 6, the LED lighting unit 24 lights the LED 11, and emits the red color (R) of second light of which the wavelength is 650 nm. The second light which is emitted passes through the light leading member 25, and is entered into the mirror 13, and after the second light is reflected by the mirror 13, the second light is entered into one end of the hollow pipe 26. In addition, in such a case, as shown in FIG. 7, the second light is entered into the mirror 13 in the quadrangle shape of light emitting area which is the shape of the light leading member 25. In addition, the light emitting spot S shown in FIG. 7 shows the central position of the light emitting area.

Moreover, as shown in FIG. 6, because the first light which is emitted from the lamp 10 is shaded by the mirror 13, that is, is reflected by the mirror 13, the first light is not entered into the hollow pipe 26. The first light which is reflected is absorbed with the shading plate 21.

The red color (R) of second light which is entered into the hollow pipe 26 is emitted to the projection lens 4 as the red color (R) of light after modulating, as well as in the case of the green color (G) of first light which is above-mentioned.

As mentioned above, according to the apparatus 2 and the projector 1 of the present embodiment, the first light and the second light which are emitted from two light sources, that is, the lamp 10 and the LED 11, and of which colors are different, can be entered into the DMD 3, while being selected in the time series, using the wheel 14, and thereby the projection of the image can be carried out by the DLP system.

In particular, it is not necessary to provide the composition unit, such as the prism, or the like as in the conventional technology, the first light and the second light are surely transmitted or reflected by only the wheel 14, and can be selected in the time series and be taken out, and thereby the excessive optical system for the composition unit need not be provided. Therefore, simplification and miniaturization of the constitution can be attained.

Furthermore, because the second light emitted from the LED 11 is the light of which the wavelength is 650 nm, the color rendering property of the red color (R) can be increased. Therefore, the area in which the color expression cannot be carried out can be decreased as much as possible. Therefore, the observation of the projection image can be performed with sufficient brightness and clear color.

Moreover, because the transmission filter area 12 is provided with the first transmission member 12a and the second transmission member 12b which obtain the green color (G) of light and the blue color (B) of light which are different from the wavelength band (650 nm) of the red color (R) of second light emitted from the LED 11 among the red color (R), the green color (G), and the blue color (B) of light, three primary colors can be obtained in which the brightness of the blue (B) and the green (B) is sufficient and the color rendering property of the red color (R) is excellent. Therefore, all colors can be output in the state in which the color rendering property of the red color (R) system is increased.

Moreover, when the transmission filter area 12 reaches to the entering position of the first light emitted from the lamp 10 (at the timing in which the second light emitted from the LED 11 is not reflected by the mirror 13), because the LED lighting unit 24 put out the LED 11, the second light is not mixed into the first light, and the first light is surely entered into the hollow pipe 26. Furthermore, the mirror 13 transmits the second light, and reflects the first light, and thereby the mirror 13 shades the first light so that the first light is not entered into the hollow pipe 26.

Therefore, the first light and the second light can be surely distinguished from each other in the time series, and the proper use of both lights can be carried out.

Moreover, because the lamp 10 and the LED 11 are arranged so that both the first light and the second light are entered into at the angle of 45 degree with regard to the plane of the wheel 14, respectively, each position relation can be arranged with good balance, and the design is easy. In particular, the direction of the second light emitted from the LED 11 is changed (due to the reflection by the mirror 13), and the second light is entered into the hollow pipe 26, the efficiency is good, and the design is easy.

Moreover, because the wheel 14 can be formed as a disc shape, the manufacturing is easy, and reduction in the manufacturing cost can be carried out.

In addition, in the above-mentioned first embodiment, although the lamp such as the high-pressure mercury lamp, or the like is described as an example of the first light source, the first light source is not limited to the lamp 10, and for example, a white LED may be used as the first light source.

Moreover, although the LED 11 which emits the red color (R) of second light is used as the second light source, the LED which emits the blue color (B) of light or the green color (G) of light may be used as the second lighting source, or the LED which emits other colors of light may be used, while the LED which emits two colors of the blue color (B) and the green color (G) may be used.

Moreover, in such a case, the mirror 13 corresponding to each LED is provided, while the rotation of the wheel 14 may be synchronized with the lighting of the LED.

Figure 8:
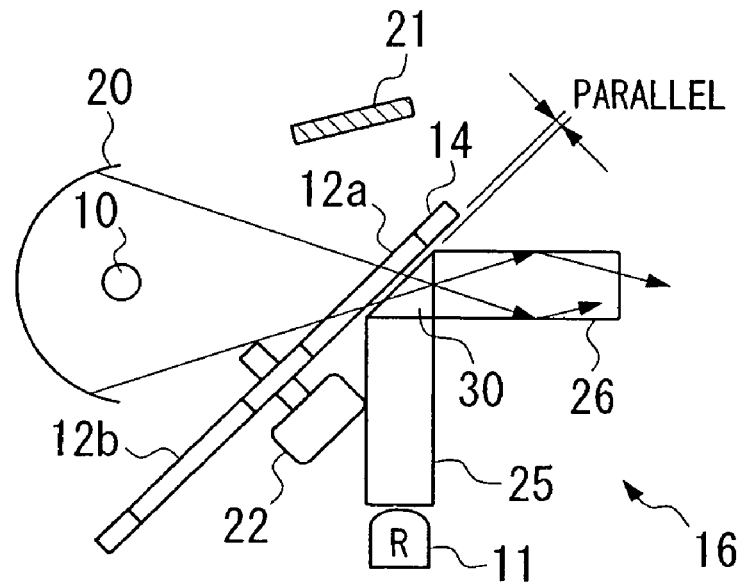
FIG. 8 is an example modifying the light emitting apparatus shown in FIG. 1, and is a construction view in which a pipe connection portion is provided between a light leading member and a hollow pipe.
Figure 9:
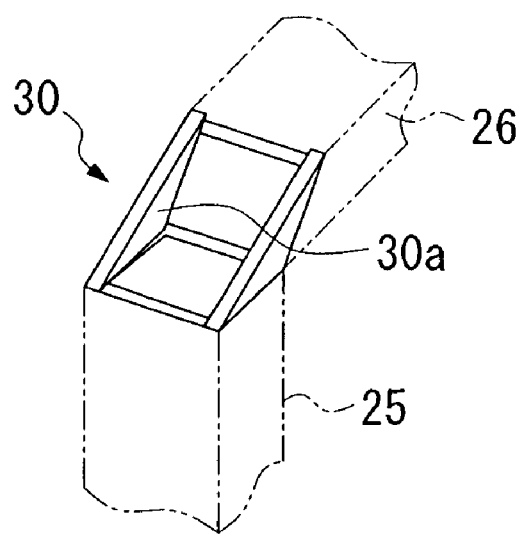
FIG. 9 is a perspective view of the pipe connection portion shown in FIG. 8.

In addition, in the above-mentioned first embodiment, as shown in FIG. 8, the pipe connection portion 30 which connects the light leading member 25 and the hollow pipe 26 may be provided between the light leading member 25 and the hollow pipe 26. As shown in FIG. 9, the inner surface of the pipe connection portion 30 is made from the reflection file 30a.

By providing the pipe connection portion 30, the second light which is emitted from the light leading member 25, and reflected by the mirror 13 can be entered into the hollow pipe 26 without leaking to outside, and in addition, the first light which is transmitted in the transmission filter area 12 can be entered into the hollow pipe 26 without leaking to the outside. In particular, because the hollow pipe 26 is used, the first light and the second light can be efficiently led without reflecting on the surface of the entering end. Therefore, the first light and the second light can be more efficiently entered into the DMD 3.

In addition, the light leading member 25 and the hollow pipe 26 of which insides are filled may be used.

Figure 10:
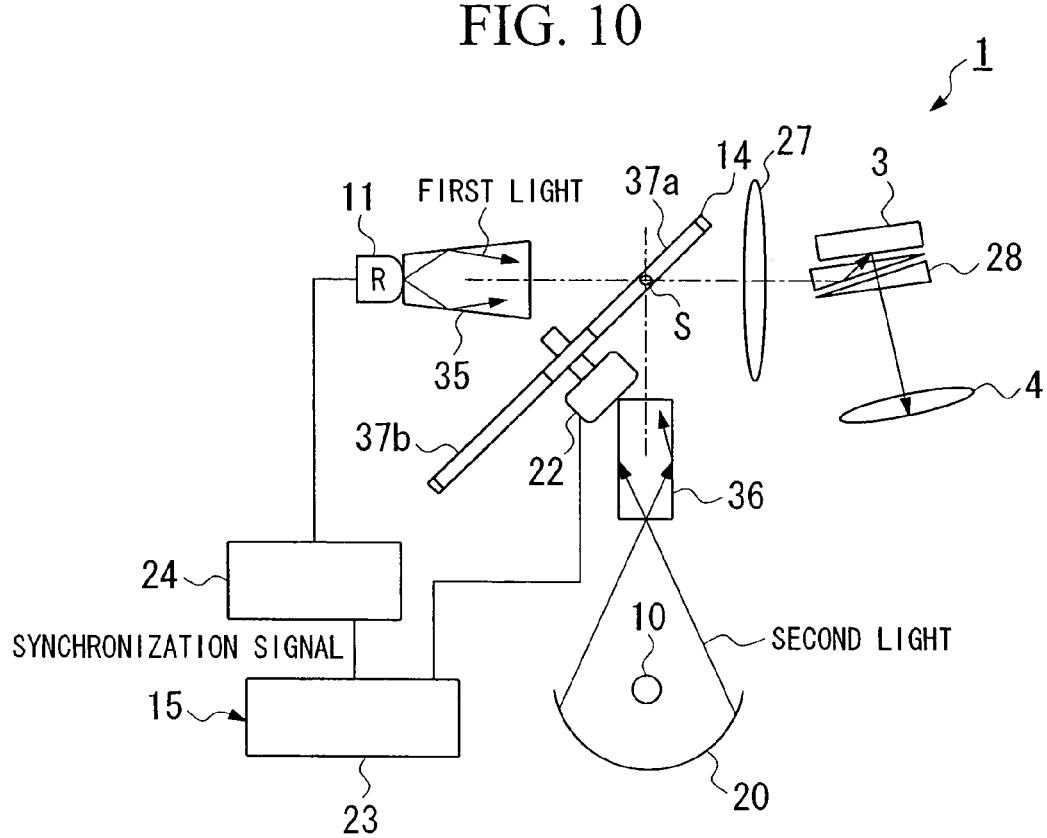
FIG. 10 is an example modifying the light emitting apparatus shown in FIG. 1, and is a construction view in the case in which LED is applied to the first light source, and a lamp is applied to the second light source.

Furthermore, in the first embodiment, although the lamp 10 is used as the first light source, and the LED 11 is used as the second light source, it is not limited to the above, as shown in FIG. 10, and the LED 11 which emits the red color (R) of light (the first light) may be used as the first light source, and the lamp 10 which emits the white color (W) of light (the second light) may be used as the second light source.

In such a case, a taper rod 35 may be provided between the LED 11 and the wheel 14, and the taper rod narrows NA of the light emitted from the LED 11, and makes NA of the light equalize. Moreover, the hollow pipe 36 which is the integrator rod is provided between the lamp 10 and the wheel 14, and thereby the lighting unevenness of the light which emitted from the lamp 10 is lost, and equalization can be attained. In addition, the emitting ends of the taper rod 35 and the hollow pipe 36 are the quadrangle shapes, of which emitting ends are arranged so that the image formation by the lens 27 is performed on the modulation surface of the DMD 3.

Figure 11:
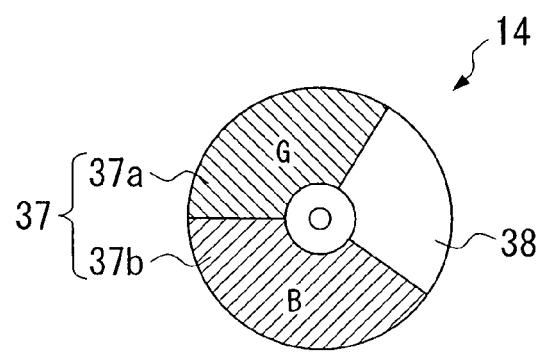
FIG. 11 is a view which shows an example of the wheel constituting the light emitting apparatus shown in FIG. 10.

Moreover, as shown in FIG. 11, the wheel 14 has the reflection area 37 which is composed of a first dichroic mirror (a dichroic surface) 37a in which the green color (G) (the second color) of light is reflected, while the other colors (the first color) of light is transmitted, and a second dichroic mirror (a dichroic surface) 37b in which the blue color (B) (the second color) of light is reflected, while the other colors (the first color) of light is transmitted, and the wheel 14 has also the transmission filter area which is composed of the third dichroic mirror (which may be have a slit in which all colors are transmitted) 38 which transmits the red color (R) of light.

Moreover, when the third dichroic mirror 38 is positioned at the light emitting spot S, the LED lighting unit 24 controls so that the LED 11 is turned on, and when the third dichroic mirror 38 is positioned at another place, the LED lighting unit 24 controls so that the LED 11 is put out light.

Moreover, when the first dichroic mirror 37a and the second dichroic mirror 37b are positioned at the light emitting spot S, the white light which is emitted from the lamp 10 is reflected by each of the dichroic mirrors 37a and 37b, and illuminates the DMD 3 by each color of light.

By such a constitution, even if the first light source is the LED 11, and the second light source is the lamp 10, the light emitting of the DMD 3 which is the illumination area can be performed by changing over the color light in the time series according to the rotation driving of the wheel 14.

Next, the second embodiment of the light emitting apparatus according to the present invention is explained with reference to FIG. 12 and FIG. 13. In addition, in the second embodiment, corresponding symbols are attached to corresponding components as in the first embodiment, and explanation of the corresponding components as in the first embodiment is omitted.

Figure 12:
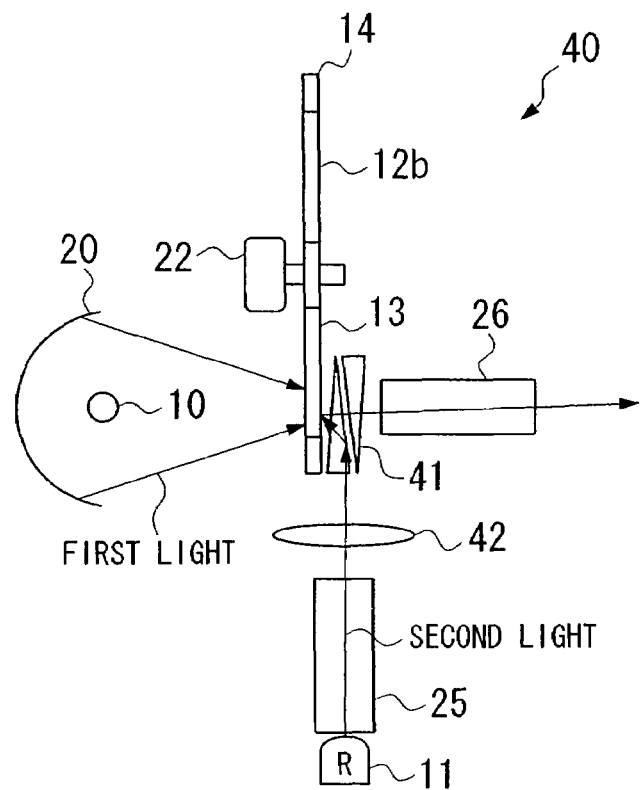
FIG. 12 is a construction view of the light emitting apparatus of the second embodiment according to the present invention.

The different feature between the second embodiment and the first embodiment is that, in the first embodiment, both the lamp 10 and the LED 11 are arranged so that the first light and the second light are entered at an angle of 45 degrees with respect to the plane of the wheel 14, respectively, and in contrast to the above, in the light emitting apparatus 40 of the second embodiment, as shown in FIG. 12, the lamp 10 is arranged so that the first light is entered at right angles with respect to the plane of the wheel 14, while the LED 11 is arranged so that the second light is emitted in parallel with respect to the plane of the wheel 14.

That is, in the light emitting apparatus 2 of the present embodiment, TIR prism 41 is arranged at the position in which the second light reflected by the mirror 13 is passed through, and is entered into the hollow pipe 26, and at the position in which the first light passing through the transmission filter area 12 is entered into the hollow pipe 26, and the TIR prism 41 has the function in which the second light emitted from the LED 11 in parallel with respect to the plane of the wheel 14 is entered into the mirror 13. Moreover, the lens 42 which makes the second light passing through the light leading member 25 enter into the TIR prism 41 is arranged between the light leading member 25 and the TIR prism 41.

Figure 13:
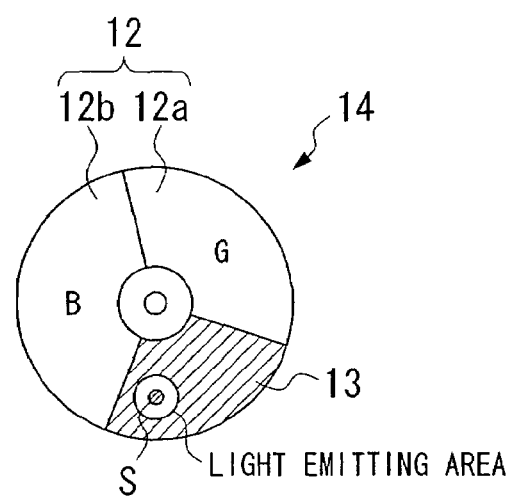
FIG. 13 is a front view of the wheel which shows a state in which the second light emitted from the LED enters into the mirror in the light emitting apparatus shown in FIG. 12.

In addition, as shown in FIG. 13, the first light is entered into the wheel 14 in the circular shape of the light emitting area, as in the first embodiment.

According to the light emitting apparatus 40 which is constituted as such, the second light can be surely entered into the mirror 13 by using the TIR prism 41, while the first light and the second light can be entered into the hollow pipe 26. Therefore, the positioning relation of the lamp 10, the LED 11, and the wheel 14 can be freely arranged, relatively, and the degree of freedom in the case of designing can be improved.

Next, the third embodiment of the light emitting apparatus 2 according to the present invention is explained with reference to FIG. 14 and FIG. 15. In addition, in the third embodiment, corresponding symbols are attached to corresponding components as in the first embodiment, and the explanation of corresponding components as in the first embodiment is omitted.

Figure 14:
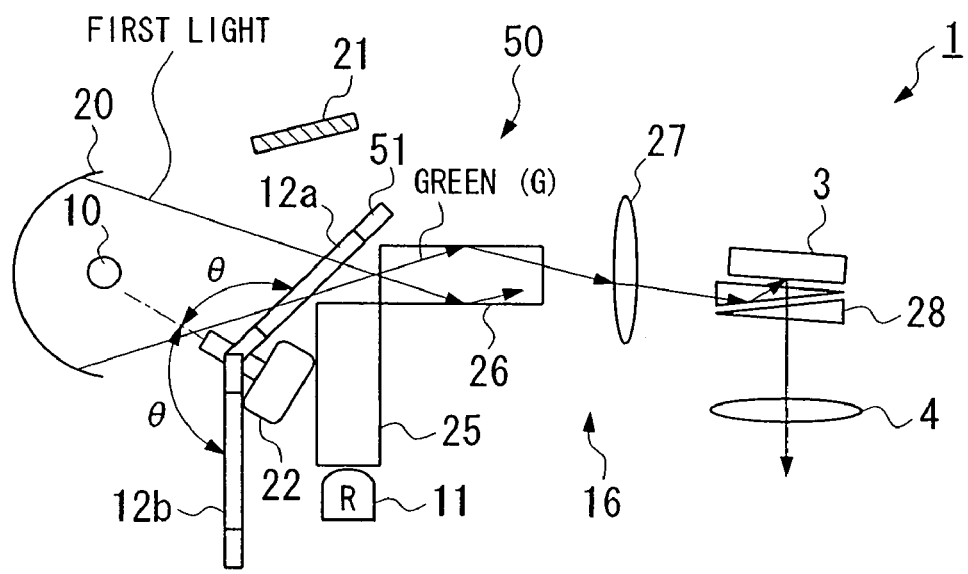
FIG. 14 is a construction view of the light emitting apparatus of the third embodiment according to the present invention.
Figure 15:
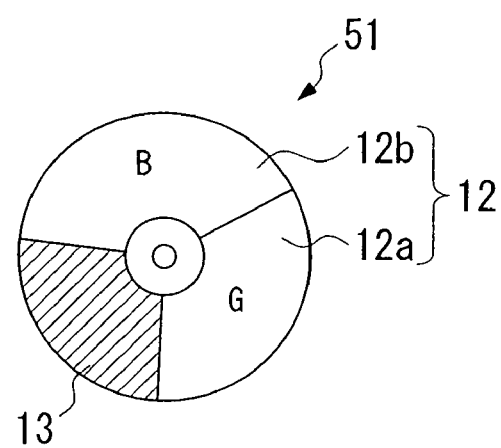
FIG. 15 is a view which shows an example of the wheel constituting the light emitting apparatus shown in FIG. 14.

The difference feature between the third embodiment and the first embodiment is that in the first embodiment, the wheel 14 is formed in a disc shape by the transmission filter area 12 and the mirror 13 which is arranged within the same plane, in contrast to the above, as shown in FIG. 14 and FIG. 15, in the light emitting apparatus 50 of the third embodiment, the wheel 51 is formed in an umbrella shape.

That is, the wheel 51 of the present embodiment is formed by the mirror 13 and the transmission filter area 12 which is arranged so that the transmission filter area 12 is maintained at the predetermined angle θ with regard to the axis which is rotated and driven. Moreover, the wheel 14 is arranged so that the second light is entered into the side of the inner circumference surface.

Thus, in the light emitting apparatus 50 which is constituted as such, because it is not necessary for the setting space of the wheel 51 which spreads toward one plane to be secured, compaction can be attained. Moreover, because the second light is entered into the side of the inner circumference surface of the wheel 51, the wheel 51 performs the function of a recess mirror, and the wheel 51 reflects the second light in the direction in which the second light is converged, the efficiency is good, and NA can be also narrowed.

In addition, the wheel 51 may be arranged so that the second light is entered into the side of the outer circumference surface.

Next, the fourth embodiment of the light emitting apparatus 2 according to the present invention is explained with reference to FIG. 16 to FIG. 20. In addition, in the fourth embodiment, corresponding symbols are attached to corresponding components as in the first embodiment, and the explanation of the corresponding components as in the first embodiment is omitted.

A difference between the fourth embodiment and the first embodiment is that, in the first embodiment, one LED 11 which emits the red color (R) of second light is provided, and in contrast to the above, in the light emitting apparatus 60 of the fourth embodiment, two varieties of LEDs 61 are provided, in which a plurality of each LED 61 are provided, and the LEDs 61 illuminate the different color light at each other, that is, the red color (R) and the blue color (B).

That is, as shown in FIG. 16 to FIG. 19, the light emitting apparatus 60 of the present embodiment is provided with a plurality of LEDs (the second light source) 61 which are arranged and fixed on the circumference of a circle, a rotation optical unit 62 which is rotatably arranged with a rotation center which is a center of the circumference of the circle, and is composed of the motor 63 and the light leading unit 64 in which each second light which is emitted from the plurality of light emitting diodes 61 is entered from the light entering end while rotating, and the second light is emitted from the light emitting end, and the taper rod 65 in which the light emitted from the rotation optical unit 62 is led to the taper rod 65.

Figure 18:
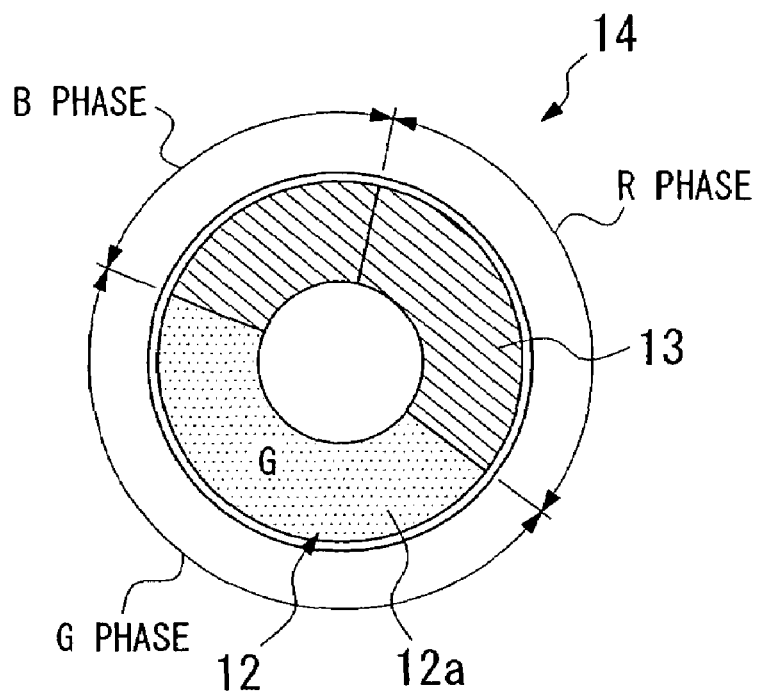
FIG. 18 is a view which shows an example of the wheel constituting the light emitting apparatus shown in FIG. 16.

Moreover, as shown in FIG. 18, the wheel 14 of the present embodiment is formed by the mirror 13 and the transmission filter area 12 which is composed of only the first transmission member 12a.

Figure 19:
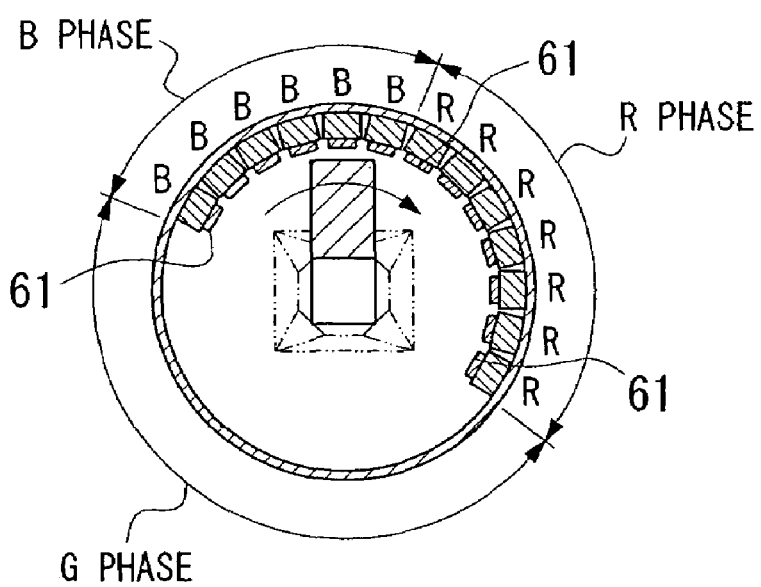
FIG. 19 is a view which shows an example of a plurality of LEDs constituting the light emitting apparatus shown in FIG. 16.

As shown in FIG. 19, the plurality of LEDs 6 are arranged on the circumference of a circle, and emit the blue color (B) of light and the red color (R) of light toward the center of the circumference of the circle. Moreover, the rate at which the plurality of LEDs 61 are arranged with regard to the circumference of the circle is the same as the rate at which the mirror 13 occupies with regard to the wheel 14. Furthermore, among the plurality of LEDs 61, the number of the LEDs 61 which emits the green color (G) of first light is a little larger than the number of LEDs 61 which emits the red color (R) or the green color (B) of second light. In addition, as shown in FIG. 18 and FIG. 19, the period in which the red color (R) of second light is emitted is shown as R phase, the period in which the blue color (B) of second light is emitted is shown as B phase, and the period in which the green color (G) of first light is emitted is shown as G phase.

Figure 20:
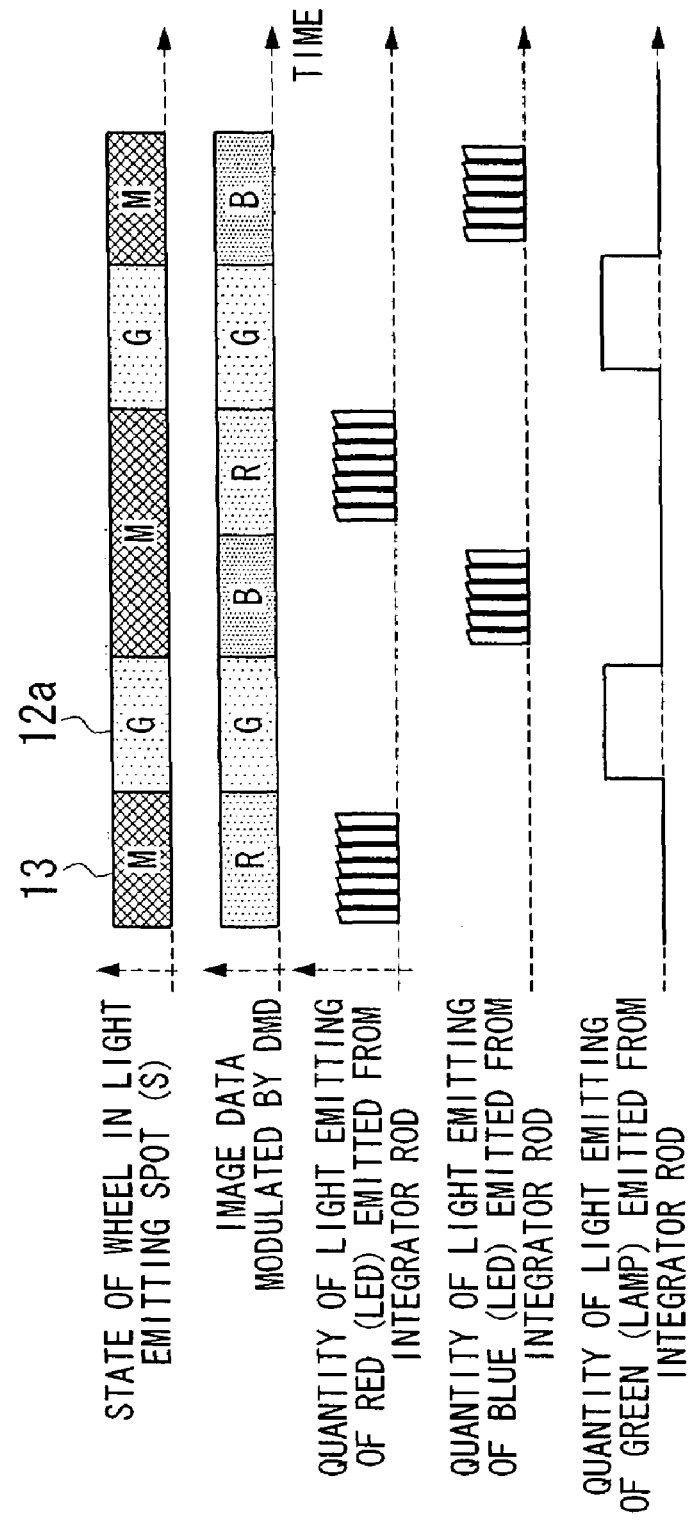
FIG. 20 is a timing chart which shows the synchronous relation between the luminescence of LED and the wheel in the light emitting apparatus shown in FIG. 16.
Figure 21:
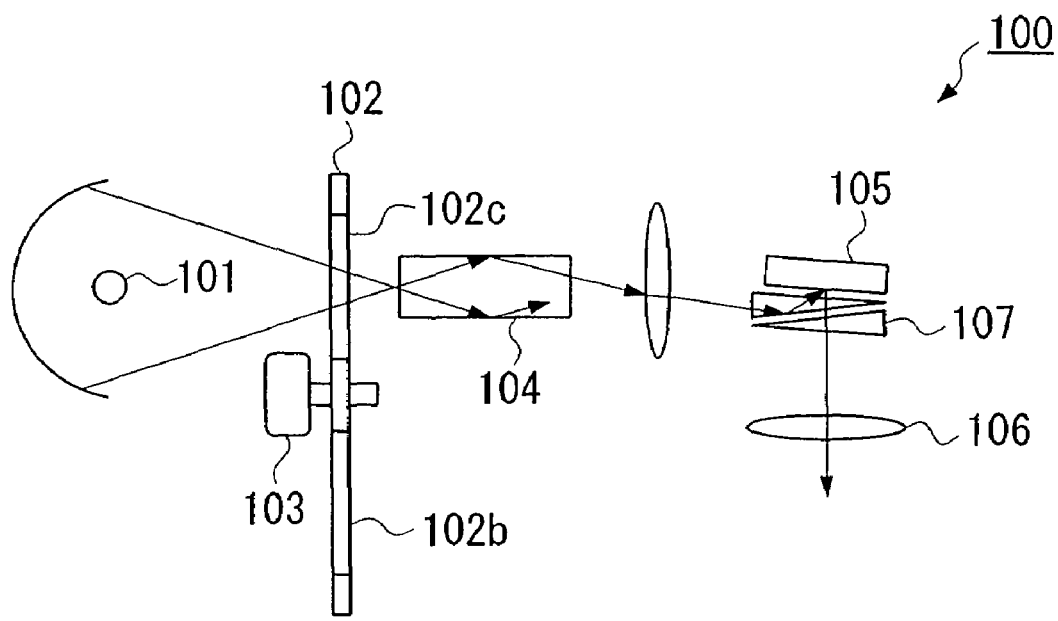
FIG. 21 is a construction view which shows a conventional DLP type of projector.
Figure 22:
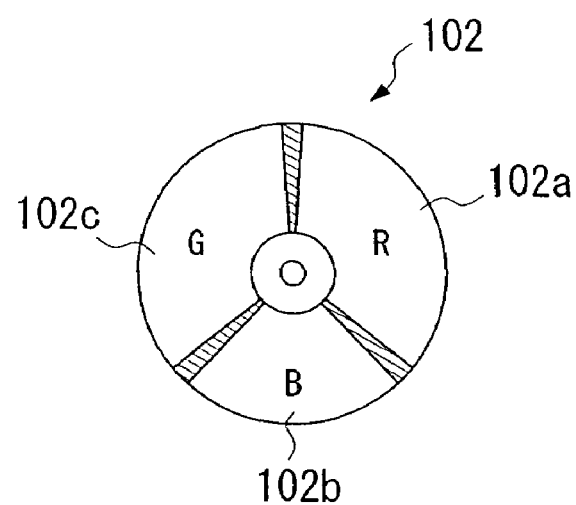
FIG. 22 is a view which shows an example of the wheel constituting the projector shown in FIG. 21.
Figure 23:
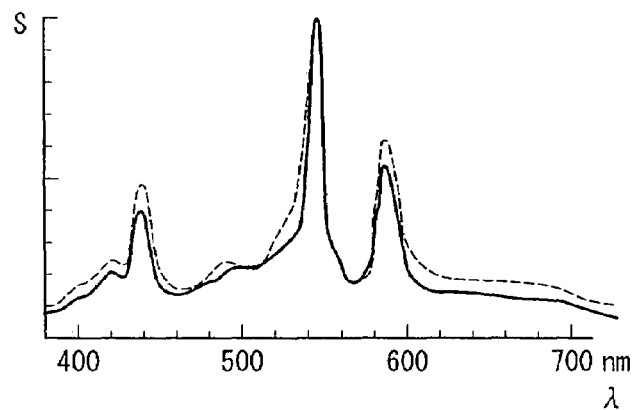
FIG. 23 is a dispersion property view which shows an example of dispersion property of very-high-pressure mercury lamp which is the representation of the lamp which constitutes the projector shown in FIG. 21.
Figure 24:
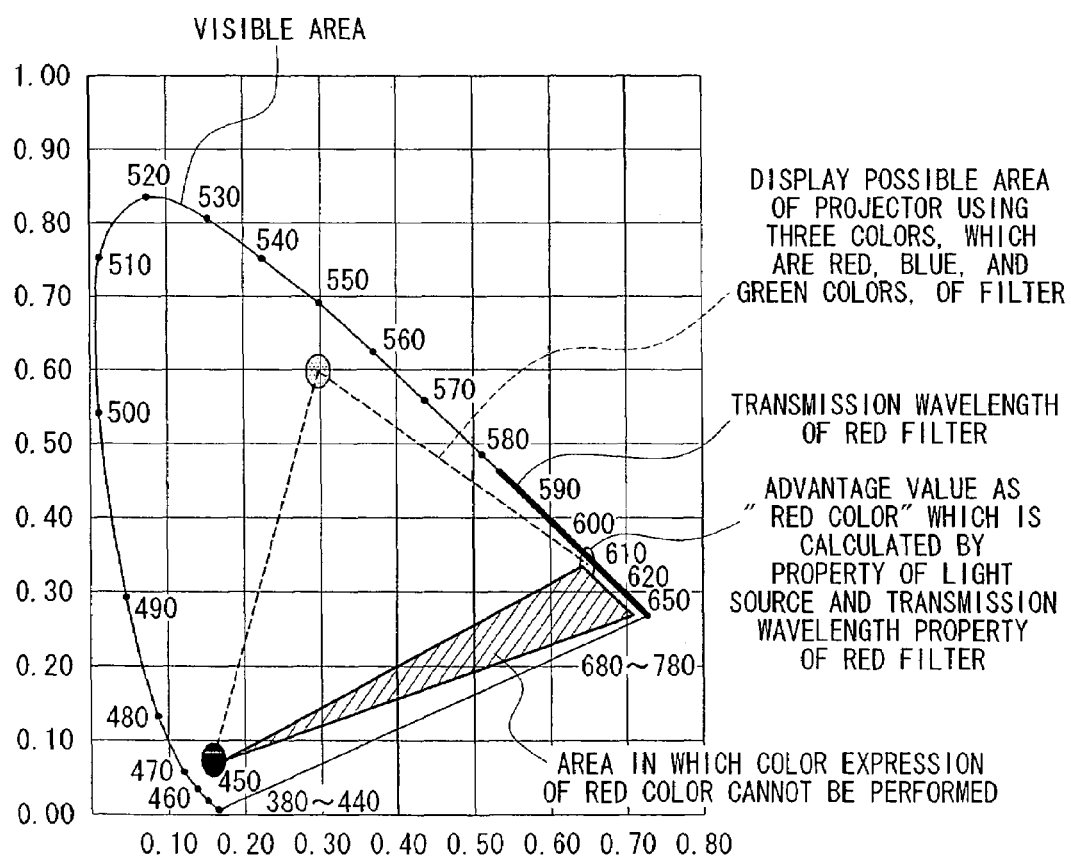
FIG. 24 is a chromaticity diagram which shows an example of the chromaticity range in the case in which the very-high-pressure mercury lamp shown in FIG. 23 is applied to the projector shown in FIG. 21.

Moreover, the LED lighting unit 24 of the present embodiment is set so that the LED lighting unit 24 makes the plurality of LEDs 61 light in order of being arranged during each different period in the time series. That is, as shown in FIG. 20, at the timing in which the mirror 13 reaches the position into which the first light emitted from the lamp 10 is entered, the lighting timing of the plurality of LEDs 61 is controlled so that the blue color (B) and the red color (R) of second light is emitted in the time series.

Figure 16:
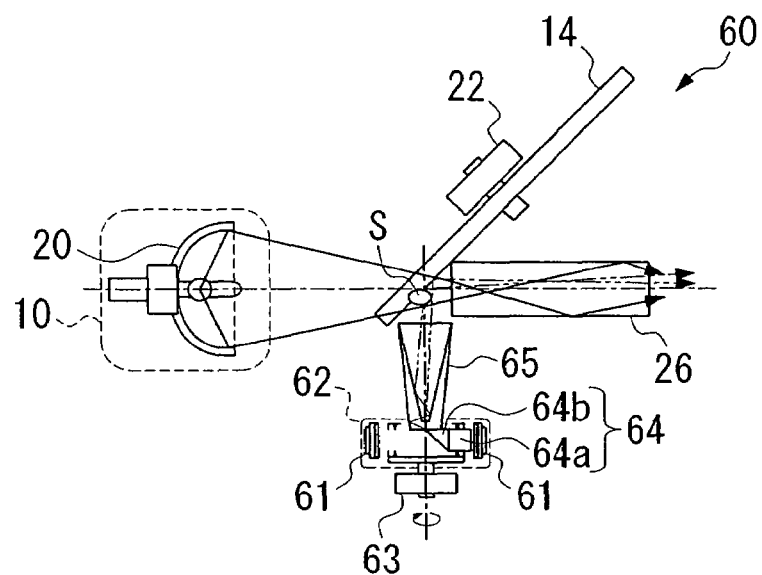
FIG. 16 is a construction view of the light emitting apparatus of the fourth embodiment according to the present invention.
Figure 17:
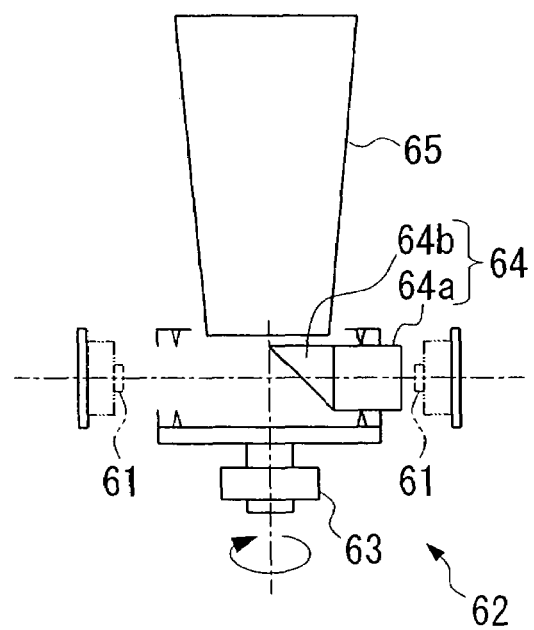
FIG. 17 is a construction view of the rotation optical unit which constitutes the light emitting apparatus shown in FIG. 16.

As shown in FIG. 16 and FIG. 17, the rotation optical unit 62 is provided with the light leading unit 64 which is rotated by the motor 63. The light leading unit 64 is formed by a parallel rod 64a in which the second light can be entered from the entering end, and a prism 64b in which the direction of the second light which passes through the parallel rod 64a is polarized at the angle of 90 degrees toward the mirror 13, and makes the second light be emitted from the emitting end.

Moreover, after the second light emitted from the prism 64b is entered into the taper rod 65, the reflection by the inner surface thereof is repeated, and the second light passes through the prism 64b, the second light is entered into the mirror 13 of the wheel 14. In such a case, NA of the second light is narrowed by the taper rod 65, and is equalized.

Furthermore, in the present embodiment, the wheel driving unit 15 and the rotation optical unit 62 are controlled so that the wheel driving unit 15 and the rotation optical unit 62 are rotated synchronized with each other. That is, the light leading unit 64 is rotated synchronized with the lighting timing of the LEDs 61. Thereby, the light leading unit 64 can surely emit the second light which is emitted from the LEDs 61 in the time series toward the mirror 13.

The case in which the light emitting of the light for the DMD 3 is performed by the light emitting apparatus 60 which is constituted as such is explained below.

First, as shown in FIG. 16, at the timing in which the first transmission member 12a reaches to the entering position of the wheel 14, the white first light emitted from the lamp 10 is transmitted to the first transmission member 12a, becomes the green color (G) of first light, and is entered into the hollow pipe 26.

Moreover, as shown in FIG. 20, at the timing in which the mirror 13 reaches the entering position of the wheel 14, the LED lighting unit 24 makes the plurality of LEDs 61 light in the time series, and makes the blue color (B) and the red color (R) of second light emit in order. The second light is emitted into the mirror via the light leading unit 64, and after the second light is reflected by the mirror 13, the second light is entered into the hollow pipe 26. Then, as in the first embodiment, each color of light is modulated by the DMD 3, and the image is projected on the screen.

According to the light emitting apparatus 60 of the present embodiment, because the plurality of LEDs 61 are provided, even if one of the LEDs 61 is broken, another LED 61 can compensate, and thereby the improvement of the reliability can be attained. In particular, because all the plurality of LEDs 61 need not be lightened at the same time, and if each LED 61 is lightened in the time series according to the rotation of the wheel 14, the light leading unit 64 surely emits the light to the mirror 13, the LEDs 61 can be efficiently used on a line.

Furthermore, because all of the LEDs 61 are not lightened at the same time, the radiation of heat can be performed during putting out light, for one LED 61, it is possible for the electric current beyond the stationary electric current to be flowed. Therefore, each LED 61 can be lightened more brightly, and as a result, the DMD 3 can be brightly illuminated, as compared with the light emitting apparatus having a constitution in which one LED 61 is always lightened.

In each above-mentioned embodiment, although the light in which the light emitting optical unit leads to the DMD is the red color (R), the green color (G), and the blue color (B) of light which are changed over in the time series, the light is not limited to the above color light, and at least two colors of light may be adopted.

Moreover, although the LED lighting unit is controlled so that the LED lighting unit timely puts out or turns on the LEDs synchronizing the rotation of the wheel, the LEDs may be not put out light, and for example, the strength of the electric current which drives the LED may be controlled so that the quantity of the second light which is emitted becomes the maximum at the timing in which the second light is reflected in the reflection area.

According to the light emitting apparatus in the present invention, either of the first light emitted from the first light source and the second light emitted from the second light source can be selected in the time series using the wheel, and can be taken out, and thereby the lighting of the illumination area can be performed. Therefore, the different colors of light which are emitted from two light sources can be surely taken out in the time series, and the lighting of the illumination area can be successively performed by each light. Moreover, the light thereof can be applied to the DLP type of projector, or the like.

In particular, the composition unit such as the prism, or the like, need not to be provided as in the case of the conventional technology, and the excessive optical system which is accompanied with the composition unit need not be provided. Therefore, simplification of the constitution can be attained, while miniaturization of he overall constitution can be attained.

Moreover, according to the projector in the present invention, at least two colors of light which is emitted from two light sources, respectively, and is taken out in the state of being distinguished from each other in the time series is modulated, the projecting light is generated, and the observation of the projection image can be performed by projecting the projecting light thereof on the screen, or the like, using the projection optical unit. Moreover, for example, the lamp is used as either one part of a light source, and the LED is used as the other part of the light source, and thereby the observation of the projection image can be performed by DLP system using the light of which the brightness is sufficient, and the color rendering property is excellent, without the area in which the color expression cannot be carried out, and with the clear color.

In the light emitting apparatus according to the present invention, when the wheel is rotated and driven at the predetermined rotation rate by the wheel driving unit, the first light emitted from the first light source is entered into the wheel which is rotated, and when the transmission filter area reaches to the entering position, the first light transmits the transmission filter area and is entered into the light emitting optical unit. Then, the first light is led to the light emitting optical unit, and the lighting of the illumination area is performed by the first light.

On the other hand, the second light emitted from the second light source is entered into the wheel which is rotated as the same, and when the reflection area reaches to the entering position, the second light is reflected by the reflection area, and is entered into the light emitting optical unit. Then, the second light is led to the light emitting optical unit, and performs the lighting of the illumination area.

Thus, either of the first light emitted from the first light source and the second light emitted from the second light source can be selected in the time series using the wheel, and can be taken out, and thereby the lighting of the illumination area can be performed. Moreover, in such a case, because the light in which the light emitting optical unit leads to the illumination area is at least two colors of light which is successively changed over in the time series, for example, the red (R) first light and the blue color (B) of second light can be used for the lighting of the illumination area, respectively.

Therefore, the different colors of light which is emitted from two light sources can be surely taken out in the time series, and the lighting of the illumination area can be successively performed by each light. Moreover, the light thereof can be applied to the DLP type of projector, or the like.

In particular, it is not necessary to provide the composition unit, such as the prism, or the like as the conventional technology, the first light and the second light are surely transmitted or reflected by only the wheel, and can be selected in the time series and be taken out, and thereby the excessive optical system which is accompanied with the composition unit need not be provided. Therefore, simplification of the constitution can be attained, while miniaturization of the overall constitution can be attained.

In the present invention, the first light source is a lamp, and the second light source is an LED.

In the light emitting apparatus according to the present invention, the first light emitted from the lamp and the second light emitted from the LED are selected in the time series, and is taken out, and thereby the lighting of the illumination area can be carried out. Moreover, because only the second light which is emitted from the LED is selected, and the lighting of the illumination area can be carried out, the lighting by the light of which color rendering property is high can be carried out. Thereby, for example, the lighting of the illumination area, or the like can be performed in the state in which the color rendering property of the red color (R) is increased.

Thus, the lighting of the illumination area can be performed by the light of which brightness is sufficient, and color rendering property is excellent, using the lamp and the LED. Moreover, the area in which the color expression cannot be carried out is able to be decreased as much as possible.

In the present invention, the first light which is emitted from the lamp is white, and the transmission filter area have at least one color among a red color (R), a green color (G), and a blue color (B).

In the light emitting apparatus according to the present invention, when the white first light which is emitted from the lamp passes through the transmission filter area, the white first light thereof becomes at least one color among the red color (R), the green color (G), and the blue color (B) of light, and is entered into the light emitting optical unit. For example, the blue color (B) of light is entered, or each color of red color (R), green color (G), and blue color (B) is entered in the time series.

Thereby, the illumination area can be lightened so that at least one color among three primary colors is the light of which brightness is sufficient.

In the present invention, a central wavelength of the light which transmits the transmission filter area is the central wavelength which is not coincident with a central wavelength of the second light.

In the light emitting apparatus according to the present invention, because the central wavelength of the transmission filter area is the central wavelength which is not coincident with the central wavelength of the second light, for example, when the LED emits the red color (R) of second light, the transmission filter area is set to the green (G), the blue (B), or the green (G) and the blue (B).

Therefore, the illumination area can be lightened while being distinctly distinguished with the light from the lamp so that at least one color among three primary colors is the light of which color rendering property is excellent.

In the present invention, the LED is composed of two varieties of LED which emit different color light.

In the light emitting apparatus according to the present invention, because the LED is composed of two varieties of LEDs which emit different color light, the illumination area can be lightened so that at least one color among the three primary colors is the light of which brightness is sufficient, while the illumination area can be illuminated by the different two colors of light of which color rendering property is excellent.

In the present invention, the second light source is the LED, the LED lighting unit which controls the second light which is emitted from lighting the LED is provided, the LED lighting unit performs pulse lighting of the LED synchronizing with rotation of the wheel, while the LED is controlled so that quantity of light of the second light which is emitted becomes maximum at a timing in which the second light emitted from the LED is reflected in the reflection area.

In the light emitting apparatus according to the present invention, when the reflection area reaches to the entering position of the first light emitted from the lamp (at the timing in which the second light emitted from the LED is reflected by the reflection area), because the LED lighting unit is controlled so that the quantity of light of the second light becomes maximum, the second light can be surely entered into the light emitting optical unit while being distinguished with the first light.

Therefore, the first light and the second light which are emitted from the LED can be distinguished from each other more surely, and proper use between the light of which brightness is sufficient and the light of which color rendering property is excellent can be performed.

In the present invention, the second light source is an LED, an LED lighting unit which controls the second light which is emitted from the LED is provided, the LED lighting unit performs lighting of the LED synchronizing with rotation of the wheel, while the LED is controlled so that the LED is put out light at a timing in which the second light emitted from the LED is not reflected in the reflection area.

In the light emitting apparatus according to the present invention, when the transmission filter area reaches the entering position of the first light emitted from the lamp (at the timing in which the second light which is emitted from the LED is not reflected in the reflection area), because the LED lighting unit turns off the LED, the first light is surely entered into the light emitting optical unit without mixing any other light. Therefore, the first light and the second light which is emitted from the LED can be distinguished from each other more surely, and proper use between the light of which brightness is sufficient and the light of which color rendering property is excellent can be performed.

In the present invention, the wheel is composed of the transmission filter area and the reflection area which are arranged within the same plane.

In the light emitting apparatus according to the present invention, because the transmission filter area and the reflection area are arranged within the same plane, the wheel can be formed as a disc shape. Therefore, the wheel can be easily manufactured, and reduction of the manufacturing cost can be obtained.

In the present invention, the wheel is composed of the transmission filter area and the reflection area which are arranged so that the transmission filter area and the reflection area is maintained at a predetermined angle with regard to an axis which is rotated and driven.

In the light emitting apparatus according to the present invention, because the transmission filter area and the reflection area are maintained at a predetermined angle with regard to an axis which is rotated and driven, the wheel can be formed in an umbrella shape. Therefore, because it is not necessary for the setting space of the wheel which spreads toward one plane to be secured, compaction reduction in size can be attained.

In the present invention, an angle between a straight line connecting a central position of area in which the first light passes through the transmission filter area and a central position of the first light source and the surface of the transmission filter area is set at 45 degrees.

In the light emitting apparatus according to the present invention, the first light emitted from the first light source can be entered into the surface of the transmission filter area at the angle of 45 degrees. In particular, the position relation between the first light source and the wheel can be made smaller, and the design becomes easy.

In the present invention, an angle between a straight line connecting a central position of area in which the second light is reflected by the reflection area and a central position of the second light source and the surface of the transmission filter area is set at 45 degrees.

In the light emitting apparatus according to the present invention, the second light emitted from the second light source can be entered into the surface of the transmission filter area, that is, the reflection area at the angle of 45 degrees. Thereby, the position relation of the first light source, the second light source, and the wheel can be made smaller, and the design becomes easy.

In the present invention, a total internal reflection (TIR) prism is provided at a position in which the second light which is emitted from the second light source is entered into the reflection area, while the second light which is reflected by the reflection area is passed through, and at a position in which the first light which is emitted from the first light source and passes through the transmission filter area is entered into the light emitting optical unit.

In the light emitting apparatus according to the present invention, the second light emitted from the second light source is entered into the reflection area via the TIR prism, while the second light is entered into the light emitting optical unit via the VIR prism, again, after reflecting. Moreover, after the first light emitted from the first light source is transmitted to the transmission filter area, the first light is entered into the light emitting optical unit via the TIR prism. Thus, using the TIR prism, the second light can be entered into the reflection area, while the first light and the second light can be entered into the light emitting optical unit.

In the present invention, the second light source is provided with a plurality of LEDs which are arranged on the circumference of a circle, a LED lighting unit which makes the plurality of LEDs light in order of being arranged on the circumference of the circle during different period in a time series, a rotation optical unit which is rotatably arranged with a rotation center which is a center of the circumference of the circle, in which each light which is emitted from the plurality of LEDs is entered from the light entering end while rotating, and the light is emitted from the light emitting end, in which the wheel driving unit and the rotation optical unit are controlled so that the wheel driving unit and the rotation optical unit rotate while synchronizing.

In the light emitting apparatus according to the present invention, the LED lighting unit makes the plurality of LEDs light in order of being arranged on the circumference of the circle during a different period in a time series. Moreover, the wheel driving unit rotates the rotation optical unit synchronizing with the lighting timing of the LED. Thereby, the second light emitted from the LED is entered from the light entering end of the rotation optical unit, is emitted from the light emitting end of the rotation optical unit, and is led to the reflection area.

Thus, the second light which is emitted from the lighting LED among the plurality of LEDs is led to the reflection area via the rotation optical unit. Therefore, the second light emitted from the LED can be efficiently obtained, and can be utilizably used. Moreover, because the plurality of LEDs is provided, even if one of the LEDs is broken, the other LED can compensate, and thereby the improvement in the reliability can be attained.

In the present invention, the reflection area transmits the second light, while the reflection area shades the first light so that the first light is not led to the light emitting optical unit.

In the light emitting apparatus according to the present invention, because the reflection area shades the first light emitted from the first light source so that the first light is not led to the light emitting optical unit, no other light is mixed in the second light emitted from the second light source. Therefore, the first light and the second light can be distinguished with each other more surely, and proper use between the light of which brightness is sufficient and the light of which color rendering property is excellent can be performed.

In the present invention, the light emitting optical unit is set so that the light emitting optical unit leads two colors of light consisting of a first color and a second color to the illumination area, and the reflection area is formed by a dichroic surface which transmits the first colored light, and reflects the second colored light.

In the light emitting apparatus according to the present invention, because the reflection area transmits the first colored light, and reflects the second colored light, both the first light and the second light which are emitted from the first light source and the second light source, respectively, can be used for each color. That is, the first color among the first light which is emitted from the first light source is transmitted in the reflection area, and the second color among the second light which is emitted from the second light source is reflected by the reflection area. Thus, proper use between the first light and the second light can be performed according to the colors.

The present invention is a projector which projects the image according to the image information which is inputted, has the above-mentioned light emitting apparatus, a space modulation unit which modulates the light led by the light emitting optical unit according to the image information, and generates the projecting light, and a projection optical unit which projects the projecting light generated by the space modulation unit.

In the projector according to the present invention, the space modulation unit modulates the light led by the light emitting optical unit according to the image information, that is, at least two colors of light which are emitted from two light sources, and is taken out in the state of being distinguished in the time series, and generates the projecting light, and the projecting light thereof is projected on the screen, or the like by the projection optical unit, and there by the observation of the projection image can be performed.

Moreover, for example, the lamp is used as either one part of a light source, and the LED is used as the other part of light source, and thereby the observation of the projection image can be performed by DLP system using the light of which brightness is sufficient, and color rendering property is excellent, without the area in which the color expression cannot be carried out, and with the clear color.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A light emitting apparatus which illuminates an illumination area, comprising:
a first light source which emits a first light;
a second light source which emits a second light;
a wheel which is provided with a transmission filter area which transmits the first light, and a reflection area which reflects the second light;
a wheel driving unit which controls a rotation of the wheel, and drives the wheel; and
a light emitting optical unit which leads the first light which transmits the transmission filter area, or the second light which is reflected by the reflection area to the illumination area,
wherein the light which is led to the illumination area by the light emitting optical unit is at least two colors of light which are successively changed over in a time series;
wherein the second light source comprises a plurality of light emitting diodes which are arranged on the circumference of a circle, a light emitting diode lighting unit which makes the plurality of light emitting diodes light in order of being arranged on the circumference of the circle during different period in a time series, a rotation optical unit which is rotatably arranged with a rotation center which is a center of the circumference of the circle, in which each light which is emitted from the plurality of light emitting diodes is entered from the light entering end while rotating, and the light thereof is emitted from the light emitting end, and
wherein the wheel driving unit and the rotation optical unit are controlled so that the wheel driving unit and the rotation optical unit rotate in synchrony.

2. A light emitting apparatus according to claim 1, wherein the first light source is a lamp.

3. A light emitting apparatus according to claim 2, wherein the first light which is emitted from the lamp is white, and the transmission filter area has at least one color among a red color, a green color, and a blue color.

4. A light emitting apparatus according to claim 3, wherein a central wavelength of the light which is transmitted at the transmission filter area is the central wavelength which is not coincident with a central wavelength of the second light.

5. A light emitting apparatus according to claim 2, wherein the light emitting diodes are composed of two varieties of light emitting diodes which emit different color light.

6. A light emitting apparatus according to claim 1, wherein
the light emitting diode lighting unit performs pulse lighting of the light emitting diode synchronizing with rotation of the wheel, while the light emitting diode is controlled so that quantity of light of the second light which is emitted become s maximum at a timing in which the second light emitted from the light emitting diode is reflected in the reflection area.

7. A light emitting apparatus according to claim 1 1, wherein
the light emitting diode lighting unit performs lighting of the light emitting diode synchronizing with rotation of the wheel, while the light emitting diode is controlled so that the light emitting diode is put out light at a timing in which the second light emitted from the light emitting diode is not reflected in the reflection area.

8. A light emitting apparatus according to claim 1,
wherein the wheel is composed of the transmission filter area and the reflection area which are arranged within the same plane.

9. A light emitting apparatus according to claim 1,
wherein the wheel is composed of the transmission filter area and the reflection area which are arranged so that the transmission filter area and the reflection area are maintained at a predetermined angle with regard to an axis which is rotated and driven.

10. A light emitting apparatus according to claim 8 or 9,
wherein an angle between a straight line connecting a central position of area in which the first light passes through the transmission filter area and a central position of the first light source and the surface of the transmission filter area is set at 45 degrees.

11. A light emitting apparatus according to claim 8 or 9,
wherein an angle between a straight line connecting a central position of area in which the second light is reflected by the reflection area and a central position of the second light source and the surface of the transmission filter area is set at 45 degrees.

12. A light emitting apparatus according to claim 1,
wherein a total internal reflection prism is provided at a position in which the second light which is emitted from the second light source is entered into the reflection area, while the second light which is reflected by the reflection area passes through, and at a position at which the first light which is emitted from the first light source and passes through the transmission filter area is entered into the light emitting optical unit.

13. An light emitting apparatus according to claim 1,
wherein the reflection area reflects the second light, while the reflection area shades the first light so that the first light is not led to the light emitting optical unit.

14. An light emitting apparatus according to claim 1,
wherein the light emitting optical unit is set so that the light emitting optical unit leads two colors of light consisting of a first color and a second color to the illumination area, and the reflection area is formed by a dichroic surface which transmits the first colored light, and reflects the second colored light.

15. A projector which projects the image according to the image information which is inputted, comprising:
the light emitting apparatus according to claim 1;
a space modulation unit which modulates the light led by the light emitting optical unit according to the image information, and generates the projecting light; and
a projection optical unit which projects the projecting light generated by the space modulation unit.

* * * * *